United States Patent Office 3,546,249
Patented Dec. 8, 1970

3,546,249
PEROXIDIC COMPOSITIONS AND PROCESS FOR THE PREPARATION THEREOF
Hans G. Gerritsen and Arnold Schroeder, Deventer, Netherlands, assignors to Koninklijke Industrieele Maatschappij Noury & van der Lande N.V., Deventer, Netherlands, a corporation of the Netherlands
No Drawing. Filed Feb. 19, 1968, Ser. No. 706,608
Claims priority, application Netherlands, Feb. 21, 1967, 6702570
Int. Cl. C07d 19/00; C07c 73/00, 73/06
U.S. Cl. 260—338                                    8 Claims

ABSTRACT OF THE DISCLOSURE

Peroxidic compositions are provided which are useful, e.g., as initiators for polymerizing unsaturated polyester resins from unsaturated polyesters and monomers containing one or more $CH_2=C<$ groups such as, e.g., styrene. The peroxidic compositions are obtained by reacting diacetone alcohol with an aqueous solution of hydrogen peroxide under certain rather closely specified reaction conditions.

---

This invention relates to the preparation of peroxidic compositions and is especially concerned with compositions of a peroxidic nature which can be used in the polymerization of unsaturated polyester resins.

It is well known that unsaturated polyesters may be copolymerized with a number of monomeric substances with the aid of free-radical-liberating compounds, and, particularly, organic peroxides, in order to produce unsaturated polyester resins.

The term "unsaturated polyester resins" is to be understood herein as meaning mixtures of or derived from unsaturated polyesters and monomers containing one or more $CH_2=C<$ groups.

Unsaturated polyesters are obtained by reacting a polyhydric alcohol, for example, a dihydric alcohol such as ethylene glycol, propylene glycol or diethylene glycol, or a mixture of polyhydric alcohols, with an unsaturated dicarboxylic acid, for example maleic acid, fumaric acid or itaconic acid; and if desired, in the presence of a saturated dicarboxylic acid, for example malonic acid, adipic acid, sebacic acid, tartaric acid, phthalic acid, isophthalic acid or tetrachlorophthalic acid.

Styrene, vinyl toluene, vinyl chloride, vinyl acetate and methylmethacrylate are mostly used as copolymerizable monomers in the preparation of unsaturated polyester resins. Generally, the ratio between the monomer and the unsaturated polyester in the mixture ranges from 30–50 parts by weight of the monomer to 70–50 parts by weight of the unsaturated polyester.

If it is desired to carry out the copolymerization of the monomer with the unsaturated polyester at room temperature, accelerators are added to the mixture to be copolymerized, in addition to organic peroxides, in order to cause rapid decomposition of the peroxides into free radicals at the temperature employed. Cobalt octoate, vanadium naphthenate and manganese compounds are used as such accelerators.

In British Patent No. 937,166, a process for the preparation of bis-3-(3,5,5-trimethyl-1,2-dioxolanyl)peroxide (mesityl oxide peroxide) is described wherein diacetone alcohol is reacted in an aqueous medium with hydrogen peroxide in a molar ratio of about 2:3 in the presence of about 3.75 gram-equivalents of sulphuric acid per mol of diacetone alcohol. In British Pat. No. 937,165, this peroxide is recommended as an activator in polymerization reactions. Under normal circumstances, however, an unsaturated polyester resin does not gel with this peroxide, not even in the presence of an accelerator. Therefore, mesityl oxide peroxide has not found practical application so far.

In accordance with the present invention, it has now been found that a peroxidic composition suitable for the peroxidic copolymerization of unsaturated polyester resins and essentially consisting, as regards the peroxides present, of peroxides derived from diacetone alcohol, may be obtained by reacting diacetone alcohol with an aqueous solution of hydrogen peroxide in such a quantity that the molar ratio between the ketone alcohol and the hydrogen peroxide is equal to or more than 1:2, and preferably 1:1, at a temperature ranging from 10°–50° C. in the presence of 1–20, preferably 1–5, milligram equivalents of a completely or almost completely dissociated acid per mol of diacetone alcohol, and subsequently adjusting the reaction mixture to a pH of 3–5, and preferably a pH of 4–4.5.

It is presumed that in the composition water-soluble peroxides are formed having the following general formulae:

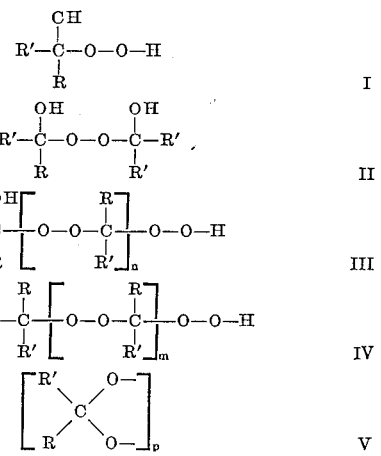

wherein:

R represents $CH_3$—;
R' represents

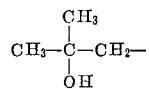

$n$ and $m=0$, 1 or 2; and
$p=2$ or 3.

The peroxidic composition according to the present invention can be used to effect a quicker hardening of the unsaturated polyester resins than, for instance, methyl ethyl ketone peroxide. Moreover, the copolymerized unsaturated polyester resins obtained have a high heat-distortion temperature due to the fact that the composition according to the present invention is applicable directly, that is to say without adding plasticizers.

The hydrogen peroxide required for the preparation of the composition according to the present invention may be added in the form of a 35%, 50%, 70% or 80% by weight solution. For economical reasons, however, a 50% or 70% by weight solution is preferred.

Sulphuric acid, phosphoric acid, toluene sulphonic acid and also strongly acid ion exchangers, such as commercially available Dowex 50 W–K 8, may be used as catalyzing acids.

In order to adjust the reaction mixture to the desired pH of 3–5, alkali metal hydroxides, ammonium hydroxide, alkali metal or alkaline earth metal carbonates, primary and secondary amines and amino alcohols may be used.

Although not necessary, inert solvents may be added to the composition according to the present invention, if desired. The reaction between the ketone alcohol and the peroxide may also be carried out in an inert solvent. Inert solvents include dimethyl or dioctyl phthalate, trimethyl or triethyl phosphate, hexylene glycol, polyoxyethylene alcohols and their ethers.

In order that the invention may be still more readily understood, the following detailed working examples are given:

EXAMPLE I

A mixture of 68 g. of 50% by weight hydrogen peroxide (1 mol) and 1 ml. of 2 N sulphuric acid (2 milligram equivalents per mol of ketone alcohol) was added with stirring to 116 g. (1 mol) of diacetone alcohol in 30 minutes. The temperature of the reaction was kept at 25° C. by cooling. After 4 hours of stirring, the pH of the reaction mixture was adjusted to 4–4.5 by the addition of 3.8 ml. or 0.5 N sodium hydroxide solution. The composition obtained (180 g.) had a total active O-content of 8.34% (98.8% of the quantity introduced). The active O-content organically bound was 4.05%.

EXAMPLE II

A mixture of 48.5 g. of 70% by weight hydrogen peroxide (1 mol) and 1 ml. of 2 N sulphuric acid (2 milligram equivalents per mol of ketone alcohol) was added with stirring to 116 g. (1 mol) of diacetone alcohol in 20 minutes. The temperature of the reaction mixture was kept at 20°–25° C. by cooling. After 4 hours of stirring at this temperature, the pH of the reaction mixture was adjusted to 4.1 by the addition of 3.7 ml. of 0.5 N sodium hydroxide solution. The composition obtained (169 g.) had a total active O-content of 9.33% (98.5% of the quantity introduced). The active O-content organically bound was 5.1%. When use was made of 350 mg. p.toluene-sulphonic acid.O.aq. (2 milligram equivalents per mol of ketone alcohol), instead of 1 ml. of 2 N sulphuric acid, and 2.6 ml. of 0.5 N sodium hydroxide solution, the pH being adjusted to 4.1, a composition (167.5 g.) was obtained having a total active O-content of 9.34% (98% of the quantity introduced). The active O-content organically bound was 5.5%.

EXAMPLE III

A mixture of 40.8 g. 83.3% by weight hydrogen peroxide (1 mol) and 1 ml. of 2 N phosphoric acid (2 milligram equivalents per mol of ketone alcohol) was added with stirring to 116 g. (1 mol) of diacetone alcohol in 30 minutes. The temperature of the reaction mixture was kept at 20°–25° C. by cooling. After 4 hours of stirring, the pH of the reaction mixture was adjusted to 4–4.5 by the addition of 10 ml. of 0.15 N sodium hydroxide solution. The composition obtained (168 g.) had a total active O-content of 9.35% (98% of the quantity introduced). The active O-content organically bound was 7.15%.

EXAMPLE IV

Using a polyester resin consisting of 70% by weight unsaturated polyester and 30% by weight styrene, mixtures were made containing the initiators and accelerators tabulated hereafter in the quantities stated. The unsaturated polyester employed herein for reaction with the styrene was prepared by esterifying 1 mol of fumaric acid and 1.1 mol of ortho-phthalic acid with 1.1 mol ethylene glycol and 1.1 mol propylene glycol at a temperature of 140° to 200° C., in the presence of a current of $CO_2$ as a sweep gas, until an acid value of 40 is obtained for the unsaturated polyester.

The gel-times of the mixtures obtained were determined at 20° C. and also the hardening, which was measured according to the Persoz hardness.

| | Parts by weight | | |
|---|---|---|---|
| Polyester resin | 100 | 100 | 100 |
| Peroxide according to the present invention | 2 | | |
| Mesityl oxide peroxide [1] | | 2 | |
| Methyl ethyl ketone peroxide [2] | | | 2 |
| Conventional cobalt accelerator (1% cobalt) | 0.25 | 0.25 | 0.25 |
| Gel-time in minutes | 7 | (*) | 16 |
| Persoz hardness after stated time: | | | |
| 2 hours | 33 | | 23 |
| 4 hours | 56 | | 44 |
| 6 hours | 73 | | 62 |
| 8 hours | 139 | | 90 |
| 24 hours | 156 | | 133 |
| 2 days | 189 | | 171 |
| 4 days | 203 | | 200 |
| 16 days | 248 | | 251 |
| 32 days | 256 | | 264 |

[1] Content 100%.
[2] In dimethyl phthalate, active 0-content 9.2%.
* At 60° C. the gel-time was >360 minutes.

EXAMPLE V 100 parts by weight of a polyester resin consisting of 70% by weight unsaturated polyester (prepared as described above in Example IV) and 30% by weight styrene were mixed with 4 parts by weight of the peroxidic composition prepared according to Example I and 0.5 part by weight of a conventional cobalt accelerator containing 1% by weight of cobalt.

The heat-distortion temperature of the resin (measured according to the ASTM-method D 648) was 72° C.

When use was made of 4 parts by weight of a methyl ethyl ketone peroxide solution in dimethyl phthalate (active O-content 9.2%) instead of the perioxidic composition according to the present invention, the heat-distortion temperature was 55° C.

While specific examples of preferred methods and compositions embodying the present invention have been set forth above, it will be understood that many changes and modifications may be made in the methods of procedure and in the compositions without departing from the spirit of the invention. It will therefore be understood that the examples cited and the particular proportions and methods of operation and the compositions set forth above are intended to be illustrative only, and are not intended to limit the scope of the invention.

What is claimed is:

1. A process for preparing a peroxidic composition, which comprises reacting diacetone alcohol with an aqueous solution of hydrogen peroxide wherein the molar ratio of the ketone alcohol to the hydrogen peroxide is equal to at least about 1:2, at a temperature in the range from about 10°–50° C., in the presence of about 1–20 milligram equivalents of a completely or almost completely dissociated acid per mol of diacetone alcohol, and subsequently adjusting the pH of the reaction mixture to a value of about 3–5.

2. A process according to claim 1, in which the molar ratio of the ketone alcohol to the hydrogen peroxide is about 1:1.

3. A process according to claim 1, in which the reaction is carried out in the presence of about 1–5 milligram equivalents of acid per mol of the diacetone alcohol.

4. A process according to claim 1, in which the pH is adjusted to a value of about 4–4.5.

5. A process according to claim 1, in which the acid used is sulphuric acid or phosphoric acid.

6. A process according to claim 1, in which a 50% or 70% by weight aqueous hydrogen peroxide solution is used.

7. A process according to claim 1, in which the reaction is carried out in an inert solvent.

8. A peroxidic composition, consisting essentially of peroxides derived from diacetone alcohol, prepared by a process according to claim 1.

References Cited

UNITED STATES PATENTS 3,047,406 7/1962 Ferrari et al. _____ 260—610X
3,160,667 12/1964 Higashiuchi et al. ____ 260—610

FOREIGN PATENTS 937,166 9/1964 Great Britain.

NORMA S. MILESTONE, Primary Examiner

U.S. Cl. X.R.

260—610